(12) United States Patent  (10) Patent No.: US 7,743,011 B2
Beesley  (45) Date of Patent: Jun. 22, 2010

(54) USING FINITE-STATE NETWORKS TO STORE WEIGHTS IN A FINITE-STATE NETWORK

(75) Inventor: Kenneth R. Beesley, Bountiful, UT (US)

(73) Assignee: Xerox Corporation, Norwalk, CT (US)

( * ) Notice: Subject to any disclaimer, the term of this patent is extended or adjusted under 35 U.S.C. 154(b) by 776 days.

(21) Appl. No.: 11/643,164

(22) Filed: Dec. 21, 2006

(65) Prior Publication Data

US 2008/0154835 A1  Jun. 26, 2008

(51) Int. Cl.
G06F 17/20 (2006.01)
G06F 17/21 (2006.01)
G06F 17/28 (2006.01)
G10L 15/18 (2006.01)
G10L 15/28 (2006.01)

(52) U.S. Cl. .................. 706/48; 704/232; 704/255
(58) Field of Classification Search .............. 706/48
See application file for complete search history.

(56) References Cited

OTHER PUBLICATIONS

Moore et al., Juicer: A Weighted Finite-State Transducer Speech Decoder, 2006.*
Schiller, "German Compound Analysis with wfsc", Sep. 2005.*
Kempe, "WFSC—A New Weighted Finite State Compiler", Sep. 2003.*
Yli-Jyrä et al., Finite-State Methods and Natural Language Processing 2005, Sep. 2005.*
Amtrup, "Morphology in Machine Translation Systems: Efficient Integration of Finite State . . . ," Kluwer Academic Publishers, pp. 24, (2003).
Kempe et al., "A Note on Join and auto-Intersection of n-ary Rational Relations," Proc. Eindhoven FASTAR Days, Netherlands, (2004).
Mohri, "Finite-State Transducers in Language and Speech Processing," Computational Linguistics, 23(2), pp. 269-311, (1997).
Mohri, "A Rational Design for a Weighted Finite-State Transducer Library," Lecture Notes in Computer Science, 1436:144-158, (1998).
Mohri et al., "An Efficient Compiler for Weighted Rewrite Rules," In 34th Annual Meeting of the Association for Computational Linguistics, Santa Crus, CA, (1996).
Noord et al., "An Extendible Regular Expression Compiler for Finite-state Approaches . . . ," In Oliver Boldt and Helmut Jurgensen, eds, WIA, vol. 2214 of Lecture Notes in Computer Science, pp. 122-139, Springer, (1999).
Eisner, "Simpler and More General Minimization for Weighted . . . ," HLT-NAACL, Edmonton, (2003).
FSA Reference Manual, at http://www.let.rug.nl/~vannoord/Fsa/Manual/node2.html, last visited Jan. 16, 2006.
Lextools Version 3.0, AT&T Corp., pp. 1-9, at http://www.clsp.jhu.edu/ws99/projects/normal/lextools/lextools.5.html, (1999).
Beesley et al., "Finite State Morphology," CSLI Publications, Palo Alto, CA, (2003).

* cited by examiner

*Primary Examiner*—Donald Sparks
*Assistant Examiner*—Nathan H Brown, Jr.
(74) *Attorney, Agent, or Firm*—Fay Sharpe LLP (57) ABSTRACT

In a weighted finite state network process, a finite state network object is stored. The finite state network object includes arcs, and each arc has an associated weight stored as a weight-defining finite state network object. The finite state network object is applied to an input. The applying includes combining weights of one or more arcs matching the input using finite state network-combining operations.

20 Claims, 2 Drawing Sheets

USING FINITE-STATE NETWORKS TO STORE WEIGHTS IN A FINITE-STATE NETWORK

BACKGROUND

Finite state networks find extensive use in diverse applications including, for example, natural language processing for automatic speech recognition, automatic speech generation, document spell-checking and spell-correction, morphological analysis and generation, and so forth. A finite state network is a directed graph consisting of a finite set of states connected by zero or more labeled transitions (also called "edges" or "arcs"); a state is typically designated as the start state, and zero or more states are designated as final states. For useful applications, a finite state network typically includes at least one arc, and may include tens, hundreds, thousands, hundreds of thousands, or more arcs. By applying a suitable finite state network to an input (typically a string, i.e., a concatenation of symbols), various functions can be performed. For example, a single-level finite state network having a single label per arc can be used as an acceptor—if at least one path of the finite state acceptor network, from the start state to a final state, traverses labeled arcs whose concatenated labels match the input string, then the input is accepted; otherwise, it is rejected. As another example, a two-level finite state network (wherein each arc has an upper-side label and a lower-side label) can be used as a transducer—arbitrarily treating the upper side as the input side, the matching of an input string to the upper-side labels of a path results in the output of one or more strings being the concatenation of the lower-side labels along the matching path or paths, thus mapping the input string of symbols to a set of output strings of symbols.

In addition to having a label on each arc, weighted finite state networks further include a weight for each arc of the network, including an understood "exit arc" leaving each final state. In some cases, the weight of an arc may be a neutral or identity weight. The weight of a network path, from the start state to a final state, is computed by combining the weights on the arcs (including the weight of the exit arc of the final state) constituting the path using an extension operation, such as multiplication. The combined weight of a set of paths is computed by combining the weights of the paths using a collection operation, such as addition. A suitable weighting paradigm, represented for example as a semiring object, defines the set of allowable weights, the extension and collection operations, and so forth. In the standard notation, a semiring is an ordered five-tuple specifying the set of allowable weights, the collection and extension operations, and the identity values for the collection and extension operations, respectively.

One example semiring is: $<R_{\geq 0},+,\times,0,1>$ where $R_{\geq 0}$ denotes a set of weights corresponding to all real numbers greater than or equal to zero, "+" denotes the collection operation which is addition in this semiring, "×" denotes the extension operation which is multiplication in this semiring, zero is the identity value for collection (A+0=A), and 1 is the identity value for extension (A×1=A). This semiring is sometimes called the "real-plus-times" semiring. If weights (w) are kept in the range 0>=w>=1, a probabilistic interpretation of these weights may be applicable. A similar semiring, called the "integer-plus-times" semiring, is constructed by replacing the floating value weights set $R_{\geq 0}$ with the set of natural integers greater than or equal to zero.

As another illustrative example semiring, $<R_{\geq 0} \cup \{\infty\}, \min,+, \infty,0>$ is the real tropical semiring where min denotes the collection operation which selects the path with the minimum weight from a set of paths, "+" denotes addition as the extension operation, $\infty$ (infinity) is the identity value for collection operation ($\min\{A, \infty\}=A$), and zero is the identity value for the extension operation (A+0=A). When using this real tropical semiring, the weights are typically negative logarithms of probabilities, interpreted as "costs," so that the additive extension operation is functionally equivalent to multiplying probabilities, and the min collection operation selects the path with the minimum cost amongst those paths matching the input. An advantage of the tropical semiring is that performing addition operations is typically faster than performing multiplication operations, making the tropical semiring computationally efficient.

To facilitate the use of weighted finite state networks, a weighted finite state network library is typically provided. The finite state network library includes various functions or components configured to create, store, minimize, apply, or otherwise process or manipulate finite state network objects stored in a selected network object storage format. Typically, the library includes functions to perform various network combining operations for selectively combining finite state networks. For example, a finite state network library typically includes: a union operation for performing a union of input finite state networks; a concatenation operation for concatenating input finite state networks; an intersection operation for determining an intersection of input finite state networks; and so forth. In addition, a typical library will include algorithms to apply finite state networks to input and retrieve the output or outputs. Useful applications such as tokenizers, spell-checkers, spell-correctors, morphological analyzers or so forth are constructed at least in part by invoking selected components of the weighted finite state network library.

Existing implementations of weighted finite state networks typically employ numerical weights, such as integer weights or floating point weights. The art has recognized that non-numerical weights could also be useful for certain applications. For example, a proposed language-union-concatenation semiring is suitably defined by the five-tuple: $<2^{\Sigma^*}, \cup, \blacksquare, \emptyset, \{\epsilon\}>$, where $2^{\Sigma^*}$ denotes the set of all languages over an alphabet $\Sigma$ (where "language" is a term of art denoting a set of strings), $\cup$ denotes union of languages, $\blacksquare$ denotes concatenation of languages, $\emptyset$ denotes the empty language, and $\{\epsilon\}$ denotes the language containing only the empty string. The language-union-concatenation semiring uses languages as weights, and hence is applicable in natural language processing and similar applications. As another example, finite state networks employing feature sets as weights are disclosed in Amtrup et al., "Morphology in Machine Translation Systems: Efficient Integration of Finite State Transducers and Feature Structure Descriptions", Machine Translation, vol. 18(3), pp. 217-238 (2003).

Although weighted finite state networks including non-numerical weights have recognized applications, existing techniques for implementing such non-numerically weighted finite state networks have disadvantages. For example, Amtrup discloses storing feature sets as weights using a custom bit-based representation of the features. Weight combinations, in this case to perform feature unification, are implemented in a bitwise fashion on the custom bit-based representation. Such a custom representation of non-numerical weights has numerous disadvantages, such as requiring additional library components or functions to implement low-level weight processing in accordance with the selected weight representational format, consequent increase in the size and complexity of the weighted finite state network library, inflexibility in modifying the weightings for different applications, difficulty in extending existing weightings to other types of weighting (for example, there is no straightforward way to modify an implementation of Amtrup's feature sets weighting to provide a language-union-concatenation based languages weighting), and so forth.

BRIEF DESCRIPTION

According to aspects illustrated herein, there is provided a weighted finite state network process. A finite state network object is stored, including one or more arcs defining one or more paths. At least one arc has an associated weight stored as a weight defining finite state network object. The finite state network object is applied to an input. The applying includes combining weights of one or more arcs matching the input using at least one of: (i) a collection operation to combine weights of parallel paths, the collection operation being implemented as a finite state network combining operation acting on weight defining finite state network objects; and (ii) an extension operation to combine weights of arcs along a path, the extension operation being implemented as a finite state network combining operation acting on weight defining finite state network objects.

According to aspects illustrated herein, there is provided a weighted finite state network library, including a plurality of network-combining operations for selectively combining finite state networks, and one or more library components configured to invoke selected network-combining operations of the weighted finite state network library to implement collection and extension operations operating on finite state network weights belonging to a set of weight defining finite state network objects.

According to aspects illustrated herein, there is provided a digital storage medium storing instructions executable to perform weighted finite state network processing including (i) storing a finite state network object including one or more arcs, at least one arc associated with a weight stored as a weight-defining finite state network object, and (ii) applying the stored finite state network object to an input, the applying including combining weights of one or more arcs using finite state network-combining operations.

According to aspects illustrated herein, there is provided a weighted finite state network process. A finite state network object including one or more arcs is stored. A weight associated with each arc of the finite state network object is stored as a weight defining finite state network object.

DETAILED DESCRIPTION

Figure 1:
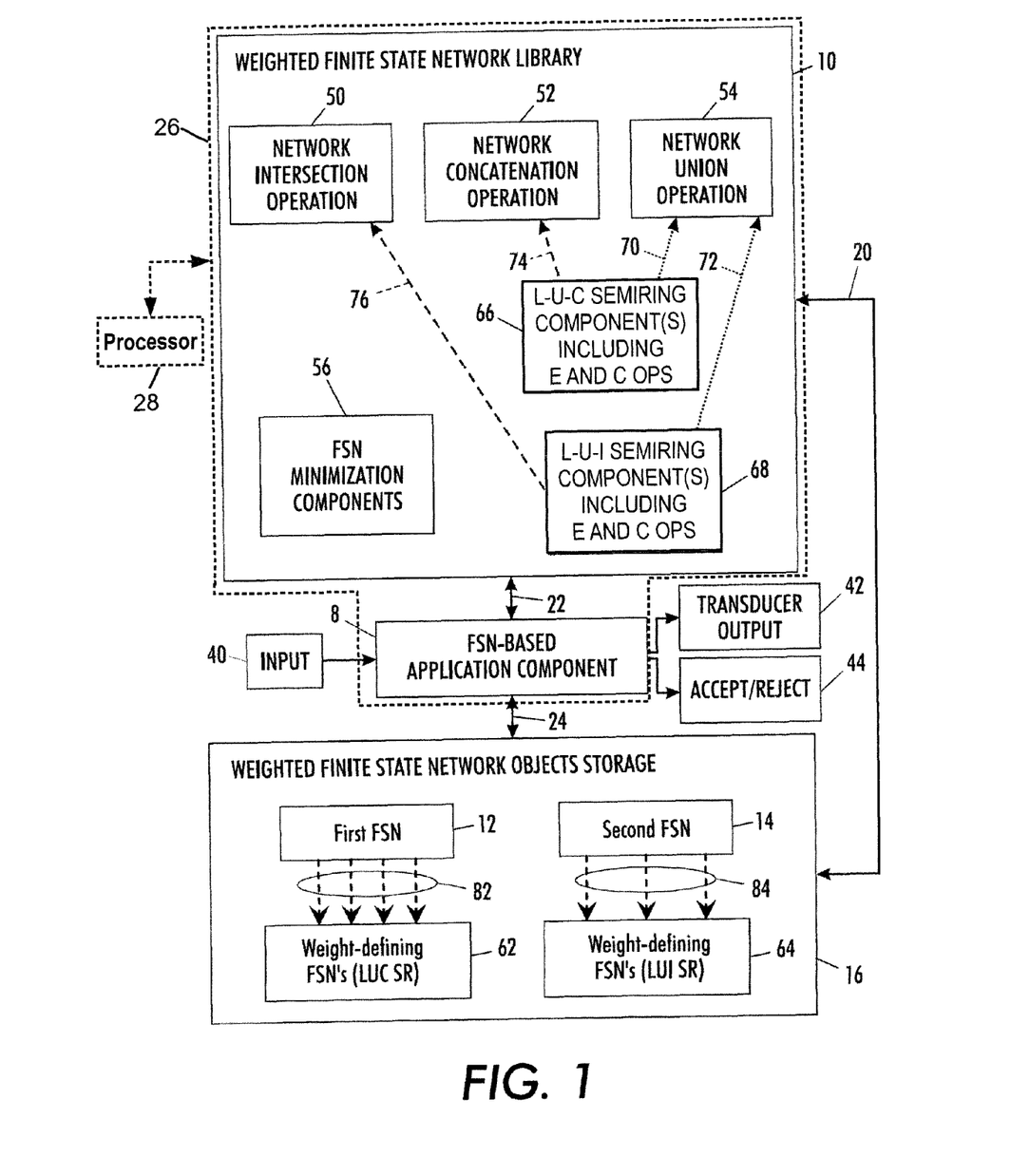
FIG. 1 diagrammatically shows an example application based on weighted finite state networks optionally employing non-numerical weights.

With reference to FIG. 1, a finite state network (FSN)-based application component 8 accesses and utilizes a weighted finite state network library 10 to create, store, maintain, modify, apply, or otherwise process or manipulate weighted finite state network objects, such as an illustrated first example finite state network object 12 and an illustrated second example finite state network object 14. The finite state network objects 12, 14 are stored in a suitable network object storage format in a weighted finite state network objects storage space 16. The storage space 16 is typically a logically defined storage space that may be embodied by or more physical storage media such as one or more magnetic disks, one or more optical disks, one or more electronic memory components, some combination thereof, or so forth. Typically, functions or other components of the finite state network library 10 access the weighted finite state network objects storage space 16 (access indicated diagrammatically in FIG. 1 by connector 20), and the application component 8 accesses the finite state networks indirectly via the functions or other components of the finite state network library 10 (diagrammatically indicated by connector 22). However, it is also contemplated for the application component 8 to perform manipulations of the finite state networks 12, 14 by directly accessing the storage space 16 (optional direct access diagrammatically indicated by connector 24). The application component 8 can invoke functions or other components of the weighted finite state network library 10 in various ways. For example, the weighted finite state network library 10 may be stored on a digital storage medium 26 separately from the application component 8 and incorporated into the application component 8 by suitable function calls or other links, or the executable code of utilized library functions or other components (the executable code being executable on a diagrammatically illustrated processor 28) may be incorporated into the application component 8 by directly copying into the relevant executable code of the library 10 into the application component 8, or so forth.

Figure 2:
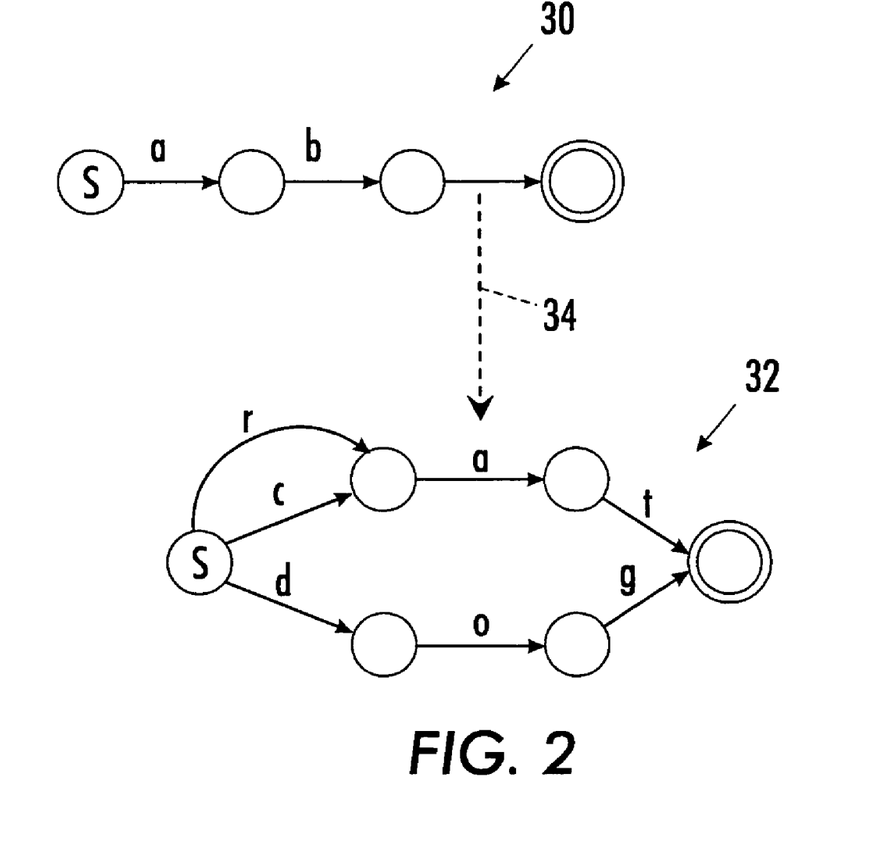
FIG. 2 diagrammatically shows an example weighted finite state network in which a non-numerical arc weight is stored as a finite state network.

With continuing reference to FIG. 1 and with further reference to FIG. 2, the weighted finite state network objects 12, 14 suitably correspond to directed graphs that each include a finite number of states, one state designated as the start state, and zero or more states designated as final states variously connected by transitions (sometimes called "arcs"). The finite state network in general includes zero or more arcs, and in practical applications may include one, several, tens, hundreds, thousands, or even more arcs. FIG. 2 shows an example weighted finite state network object 30 including a single path starting at a starting state (labeled "S" in FIG. 2) with three additional states along the path. The transition from the start state to the first intermediate state is labeled with a label "a". The transition from the first intermediate state to the second intermediate state is labeled with a label "b". The transition from the second intermediate state to the final state has a weight which is itself represented as a finite state network object 32. The weight-defining finite state network object 32 encodes the language {"rat", "cat", "dog"}. In the example of FIG. 2, the finite state network object 30 stores a pointer 34 to the weight-defining finite state network object 32, which is a suitable way to associate the weight-defining finite state network object 32 with the arc. In other embodiments, other approaches for the association may be used. For example, a "handle" in languages like Python and Java may be suitable. Each weight-defining finite state network object is associated with an arc so that that weight can be retrieved and used when the network is applied to input. The neutral weights can also be stored as finite-state networks. In some embodiments, the weight-defining finite state network objects may be stored with the weighted finite state network. Moreover, the example finite state network object 30 and the example weight-defining finite state network object 32 are illustrative examples— for typical applications, a finite state network may include several, tens, hundreds, thousands, or more states connected by suitable configurations of several, tens, hundreds, thousands, or more transition arcs.

With returning reference to FIG. 1, each transition may include one label (known as a single-level FSN), two levels (known as a two-level FSN or "transducer"), or more levels. Typically, the finite state network is applied to an input 40. A single-level finite state network can act as an acceptor, for example—the input is accepted if it matches at least one path of the FSN. A two-level finite state network can act as a transducer, for example—if the input matches the top level labels of a path or paths, then each output string is the concatenation of the lower-side symbols of a matching path. Thus, for example, the FSN-based application component 8 receives the input 40, and if the application component 8 applies a weighted FSN as a transducer then a transducer output 42 corresponding to the input 40 may be produced. If the application component 8 applies a weighted FSN as an accepter then an acceptance—or—rejection 44 of the input 40 may be produced. In other embodiments, input will need to be pre-processed before it reaches the application step. For example, in a spell-checking application, the overall input 40 may be a document that is broken up ("tokenized") into individual word strings, and the spell-checking finite state network is applied separately to each word string, either accepting it or rejecting it. For an application such as spell-correcting, the application component 8 may use weighted finite state networks. In the spell-correcting example, the document is broken into tokens, and each token is input to a weighted finite state network that returns possible correct spelling outputs each marked with a suitable weight representing its probability. The spell-correcting application then orders the outputs with most-probable-first and presents them to a human user.

To facilitate creating, storing, minimizing, applying, or otherwise processing or manipulating weighted finite state network objects 12, 14 stored in the selected network object storage format in the weighted finite state network objects storage space 16, the weighted finite state network library 10 provides various functions or other components, such as an example illustrated network intersection operation 50 which constructs an intersection of input finite state network objects, an example illustrated network concatenation operation 52 that concatenates input finite state network objects, an example illustrated network union operation 54 which constructs a union of input finite state network objects, or so forth. Finite state network minimization components 56 associated with each semiring are typically provided to simplify weighted finite state networks by identifying and removing redundant states and arcs. The weighted finite state network library 10 is typically provided to facilitate application programmers. For example, an application programmer who needs to concatenate two weighted finite state networks invokes the provided network concatenation operation 52 with the two weighted finite state networks as inputs, and the library network concatenation operator 52 performs the concatenation.

Weights for the illustrated weighted finite state network objects 12, 14 are stored as weight-defining finite state network objects 62, 64. In the illustrated example, the weights of the weighted finite state network object 12 are stored as weight-defining finite state network objects 62 each interpreted relative to a language-union-concatenation semiring, while the weights of the weighted finite state network object 14 are stored as weight-defining finite state network objects 64 each interpreted relative to a language-union-intersection semiring. One or more standard components 66 of the weighted finite state network library 10 provide a suitable implementation of the extension and collection operations(E and C ops) specified by the language-union-concatenation semiring definition. For example, the language-union-concatenation semiring specifies union as the operation for combining the weights of a set of paths, and specifies concatenation as the extension operation for combining weights along a path. Advantageously, union and concatenation are typically already supplied in the weighted finite state library. Similarly, one or more standard components 68 of the weighted finite state network library 10 provide a suitable implementation of the collection and extension operations (E and C ops) specified by the language-union-intersection semiring. For example, the language-union-intersection semiring specifies the union operation for combining the weights of a set of paths, and specifies intersection as the extension operation for combining the weights on the arcs along a path. Again, advantageously the weighted finite-state library already includes algorithms to perform the union and intersection operations.

The example language-union-concatenation and language-union-intersection semirings each employ languages (each language being a set of strings) as weights, and each employ the union operation as the collection operation to combine weights of parallel paths. Because the language weights are represented by weight-defining finite state network objects 62, 64, the language-union-concatenation collection operation is suitably performed by making a call 70 to the network union operator 54, and the language-union-intersection collection operation is similarly also suitably performed by making a call 72 to the network union operator 54. In similar fashion, the language-union-concatenation extension operation is suitably performed by making a call 74 to the network concatenation operator 52, and the language-union-intersection extension operation is similarly also suitably performed by making a call 76 to the network intersection operator 50. Because the non-numerical weights are stored as weight-defining finite state network objects 62, 64, construction of weight combining operations such as the extension and collection operations are typically simplified as these operations can be implemented using network combining functions 50, 52, 54 that are commonly provided in the weighted finite state network library 10.

In some embodiments, the semiring components implementing collection, extension, or other operations may utilize existing network combination operations, but with additional instructions included. For example, the collection operation may include instructions which adapt an existing network combination operation to perform the weight combination when the existing network combination operation is close to, but not identical with, the weight combination operation to be implemented. In some semirings, the combination operation, extension operation, or both may be implemented by an algorithm that invokes multiple functions in the finite-state library, plus auxiliary functions. Where the weights are languages or relations stored as finite state networks, the entire finite state network 10 is available for manipulating the weight-defining finite state networks, which facilitates implementing semirings that use weights that are languages or relations. Moreover, while utilizing existing network combination operations advantageously facilitates implementation of weight-based semirings, it is also contemplated to include semiring implementation components that perform weight combinations without utilizing existing network combination operations. The latter approach may be used, for example, where a more efficient weight combination can be implemented independent from the existing network combination operators, or where a particular weight combination to be implemented does not correspond sufficiently closely to an existing network combination operator, or so forth.

The weight-defining finite state network objects 62, 64 are suitably stored in the same network object storage format as the weighted finite state networks 12, 14, and the same weighted finite state network objects storage space 16, so that the various available network combining operations 50, 52, 54 can readily be applied to combine weight-defining finite state network objects 62, 64 along a path or paths matching an input. In some embodiments, the weighted finite state network 12 includes pointers 82 to the weight-defining finite state network objects 62, and similarly the weighted finite state network 14 includes pointers 84 to the weight-defining finite state network objects 64. Using the pointers 82, 84 is typically a convenient way to incorporate the weights represented as weight-defining finite state network objects; however, in other embodiments, the weight-defining finite state network objects may be stored with the weighted finite state network. In the weighted finite-state network objects 12, 14, each pointer 82, 84 typically occupies about the same amount of storage as an integer weight value. Accordingly, the use of pointers to weight-defining finite state network objects 62, 64 does not substantially increase the storage space of the finite state networks 12, 14. However, additional storage space is utilized to store the weight-defining finite state network objects 62, 64. As these weight-defining finite state network objects 62, 64 are part of the corresponding weighted finite state networks 12, 14, it follows that if, for example, the finite state network 14 is removed from the storage 16 (for example, if it is no longer needed), this removal should include removing the weight-defining finite state network objects 64 that define the weights of the removed finite state network 14.

Having generally described with reference to FIGS. 1 and 2 the use of weight-defining finite state network objects as a convenient and practical way to store non-numerical or other complex weights of weighted finite state networks, some specific examples will be described. Certain illustrative examples are described in conjunction with the semiring with which the example weights comport. Semirings are represented herein using a five-tuple of the general form: $\langle K, \oplus, \otimes, \bar{0}, \bar{1} \rangle$, where K represents the set of weights that comport with the semiring (that is, the allowable weights), $\oplus$ represents the collection operations for combining the weights of a set of paths, $\otimes$ represents the extension operation for combining weights along a path, $\bar{0}$ represents the identity value for the collection operation, and $\bar{1}$ represents the identity value for the extension operation. When a weighted finite state network is applied to an input, the weight of each matching path is computed by combining all the weights on all the arcs along the path, including the "exit arc", using the extension operation. The weight of the overall solution is computed by combining the weights of all the matching paths using the collection operation.

As one example of a weighted finite state network object in which the weights are advantageously stored as finite state network objects, the language-union-concatenation semiring is suitably implemented by the illustrated example language-union-concatenation semiring components 66 of the weighted finite state network library 10. As previously set forth in the background, the language-union-concatenation semiring is suitably defined by the five-tuple: $\langle 2^{\Sigma^*}, \cup, \blacksquare, \emptyset, \{\epsilon\} \rangle$, where the set of weights $2^{\Sigma^*}$ denotes the set of all languages over an alphabet $\Sigma$ (where "language" is a term of art denoting a set of strings), the collection operator $\cup$ denotes union of input languages, the extension operator $\blacksquare$ denotes concatenation of input languages, the identity value for collection $\emptyset$ denotes the empty language, and the identity value for extension $\{\epsilon\}$ denotes the language containing only the empty string. The weights in the language-union-concatenation semiring are languages, that is, each weight is a set of zero or more strings. The language-union-concatenation semiring uses languages as weights, and hence is applicable in natural language processing and similar applications.

Heretofore, implementation of weighted finite state networks employing the language-union-concatenation semiring has been problematic. In the present disclosure, an elegant and practical implementation is set forth—the language of each weight is stored as a weight-defining finite state network. In the illustrated approach, the weight-defining finite state networks 62 are associated with the weighted finite-state network 12 by allowing arc objects to contain pointers 82 to weight-defining finite state network objects 62. By storing the language-weights as finite state networks, the implementation 66 of the language-union-concatenation semiring is straightforward. The extension operation, indicated by the operator $\blacksquare$, simply calls 74 the network concatenation operation 52 typically already available for concatenating weighted finite state network objects to concatenate the language-weight-defining finite state networks to implement the extension operation $\blacksquare$. Similarly, the collection operation, denoted by the operator $\cup$, simply calls 70 the network union operation 54 typically already available for constructing a union of weighted finite state network objects to construct the union of language-weight-defining finite state networks to implement the collection operation $\cup$. The final weight produced by applying the finite state network object to an input is also a language, and is suitably also temporarily or permanently stored in the weighted finite state network objects storage 16 as a finite state network object.

One example application of weighted finite state networks comporting with the language-union-concatenation semiring is to inject multilingual glosses into a finite-state transducer. For example, the Arabic word wblktaab (romanized for this example) can be analyzed as having the following morphemes: wa- ("and"), bi- ("for"), 'al- ("the"), kitaab ("book"). If each string gloss is assigned as the weight of each appropriate morpheme, then the weight of the entire path in the language-union-concatenation semiring would be the concatenation "and for the book", which is a useful output for a person learning Arabic. In fact, kitaab might translate in any number of ways, including "note", "document", "deed", "marriage contract", or the "Koran". The weight of kitaab is thus suitably the language containing the set (the union) of all such translation strings. The overall weight of an analysis is still the concatenation of the language-weight for each morpheme on the path; the weights and the semiring are all suitably implemented as weight-defining finite state network objects and combined using available finite-state network combining operations 52, 54. Normal network minimization performed by the network minimization components 56 operate to store multi-string glosses in an efficient form.

The language-union-concatenation semiring would also allow featural information, including part-of-speech, person, number, gender, tense, mood, aspect, or so forth to be stored as string weights, rather than as multi-character symbols or single symbols with multicharacter names as is used in unweighted finite state networks. This is expected to be advantageous in certain applications where users wish to make a distinction between phonological/orthographical symbols and featural information.

As another example of a weighted finite state network object in which the weights are advantageously stored as finite state network objects, the language-union-intersection semiring is suitably implemented by the illustrated example language-union-intersection semiring components 68 of the weighted finite state network library 10. The language-union-intersection semiring is suitably defined by the five-tuple: $\langle 2^{\Sigma^*}, \cup, \cap, \emptyset, \Sigma^* \rangle$, where the set of weights $2^{\Sigma^*}$ denotes the set of all languages over an alphabet $\Sigma$, the collection operator $\cup$ denotes union of input languages, the extension operator $\cap$ denotes intersection of input languages, the identity value for collection $\emptyset$ denotes the empty language, and the identity value for extension $\Sigma^*$ denotes the universal language. As with the language-union-concatenation semiring, the language-union-intersection semiring uses languages as weights, and hence is applicable in natural language processing and similar applications. The language of each weight is stored as a weight-defining finite state network. In the illustrated approach, the weight-defining finite state networks 64 are linked with the weighted finite-state network 14 by allowing arc objects to contain pointers 84 to the weight-defining finite state network objects 64. By storing the language-weights as finite state networks, the implementation 68 of the language-union-intersection semiring is straightforward. The extension operation, denoted by the operator $\cap$, simply calls 76 the network intersection operator 50 typically already available for construction of an intersection of weighted finite state network objects to construct the intersection of language-weight-defining finite state networks to implement the extension operation $\cap$. Similarly, the collection operation, denoted by the operator $\cup$, simply calls 72 the network union operator 54 typically already available for construction a union of weighted finite state network objects to construct the union of language-weight-defining finite state networks to implement the collection operation $\cup$. The final weight produced by applying the finite state network object to an input is also a language, and is suitably also temporarily or permanently stored in the weighted finite state network objects storage 16 as a finite-state network object.

One example application of weighted finite state networks comporting with the language-union-intersection semiring is modeling of constraint-satisfaction problems where the individual constraints can be modeled as languages. Consider the case of Arabic stems, which may be considered as the three-part combination of a root like ktb, a consonant-vowel template like CVVCVC and a vocalization such as u*i. The weight of the root ktb is the language of all strings that contain a "radical" k followed at any distance by a radical t followed at any distance by a radical b. As a first approximation, the morpheme ktb could be denoted in a regular expression as .*k.*t.*b.*, where . denotes any symbol and .* denotes the universal language. The template CVVCVC has as its weight the language of all strings that begin with an Arabic consonant, and continue with two Arabic vowels, an Arabic consonant, an Arabic vowel and an Arabic consonant; where C stands for a union of all Arabic consonants, e.g. (k|t|b|d|r|s|m|n|q|r|...) and where V stands for a union of all vowels, in this example, (i|a|u), the regular expression denoting this language is simply CVVCVC. The weight of the vocalization u*i is the language of all strings that begin with any number of Arabic consonants, and continue with any number of u vowels, any number of Arabic consonants, a single i vowel, and any number of Arabic consonants; and it can be denoted in a regular expression as C*u*C*iC*. The intersection of the three languages (weights) is the language containing the single string kuutib, which satisfies the three constraints.

As another example of a weighted finite state network object in which the weights are advantageously stored as finite state network objects, weights which are feature sets are readily implemented as weight-defining finite state network objects. Heretofore, employing feature sets as weights typically called for selecting a suitable notation for receiving the weights, tokenizing and parsing the received weight expressions, and selecting a suitable format for storing and operating on the tokenized and parsed weight expressions. In the present disclosure, some useful classes of feature-structure weights are conveniently set forth as regular relations stored in two-level finite-state networks. As an illustrative example, a feature set is considered which contains any number of feature:value pairs, where each feature is a unique string name, and each value denotes an arbitrary regular language. One such feature set is the following:

$$\begin{bmatrix} cat & : & noun \\ num & : & sing \\ gender & : & masc \\ case & : & acc \end{bmatrix}$$

for example. Some typical feature sets might also involve OR-ed values as in the following:

$$\begin{bmatrix} cat & : & noun \\ num & : & sing|dual \\ gender & : & masc \\ case & : & acc|gen|com \end{bmatrix}$$

for example (where the vertical bar "|" indicates the OR operation), but the value might denote any regular language, including the universal language. Each feature set is a weight that is suitably represented as a weight-defining finite state network object. The semiring with which the weights comport is: $<2^{FS}, \cup, fsunif, 0, \Sigma^*:\Sigma^*>$, where $2^{FS}$ is the set of all allowable feature sets, the collection operator $\cup$ is the union operator (suitably implemented using the network union operator 54), fsunif is a specially defined extension operator, and $\Sigma^*:\Sigma^*$ is the universal relation. The extension operator fsunif is defined as follows: The identity for extension is $\Sigma^*:\Sigma^*$, the universal relation, which maps every string to every other string. Along a path, there will be some number of feature-set weights that need to be unified by the extension operator fsunif to compute the weight for the overall path. Each weight is stored as a two-tape (i.e., two-level) finite state network, and the total weight along a path will also be stored as a two-tape finite state network. A suitable fsunif algorithm for unifying a current weight with the previous total is as follows:

```
boolean fsunif (Net* total, Net* current) {
    Net * featureNames = upperside(current) ;
    foreach feature in featureNames {
        Net * curValue = lowerside(applydown(current, feature)) ;
        Net * totValue = lowerside(applydown(total, feature)) ;
        Net * newValue = intersect(totValue, curValue) ;
        if (isEmpty(newValue)) {
            // unification failed, set total to empty net
            total = emptyLanguage( ) ;
            return false ;
        } else {
            Net * newNet = crossProduct(feature, newValue) ;
            total = uppersidePriorityUnion(newNet, total) ;
        }
    }
    return true ;
}
``` where the following functions are employed: applydown(network, string) applies the network argument in a downward direction to the string argument, returning the related lowerside language; lowerside(network) returns the network encoding the lowerside language of the network; intersect (net1, net2) returns the intersection of the arguments, which denotes languages rather than relations; crossproduct(net1, net2) returns the network encoding the relation wherein net1 encodes the upperside language, and net2 encodes the lowerside language, and each string in the language of net1 is related to every string in the language of net2; and uppersidePriorityUnion(net1, net2) returns a network encoding the union of the relations encoded by net1 and net2, but giving upperside priority to net1.

As another example of a weighted finite state network object in which the weights are advantageously stored as finite state network objects, weights which are Flag Diacritics are readily implemented as weight-defining finite state network objects. Flag diacritics are a feature-like notation and semantics, a more detailed description of which is provided in Beesley & Karttunen, Finite State Morphology (CSLI Publications, Stanford, Calif., 2003). A difference between traditional feature unification and flag diacritics is that flag diacritics provide a set of feature-based operations, with unification being only one of them. These feature-based operations may include, for example: positive setting or re-setting which sets or resets the value of a feature to a new specified value, overwriting any previous value; clearing, which sets or re-sets the value of a feature to the neutral value; requiring, which requires that a feature be already set to any non-neutral value, or to a specified value; disallowing, which disallows that a feature be already set to any non-neutral value, or to a specified value; unification; and so forth. In one approach, a flag diacritic weight is suitably modeled abstractly as a set of triples:

$$\begin{bmatrix} feature1 & : & operation1 & : & value1 \\ feature2 & : & operation2 & : & value2 \\ \ldots & : & \ldots & : & \ldots \end{bmatrix}$$

A suitable way to store flag diacritic-like weights as weight-defining finite state network objects is to use a three-tape (i.e., three-level) network, assigning one level to be a language of feature names, a second level to be a language of command (i.e., operation) name strings (such as "P" for positive reset, "R" for require, "D" for disallow, or "U" for unify), and a third level to be a language of feature values. If desired, the original flag-diacritic clear operation (suitably denoted by the name string "C", for example) is easily simulated by using the "P" operation with the feature set to the universal-language value. While individual flag diacritic weights are suitably stored as three-tape transducers, the total weight for a path can be stored as a two-tape transducer of feature-value pairs as set forth previously for feature-value pair weights. A suitable semiring would be: $<2^{FDS}, \cup, \text{fdext}, \emptyset, \Sigma^*:\Sigma^*>$, where $2^{FDS}$ denotes the set of all flag diacritic feature sets, the collection operator $\cup$ is the union operator, $\emptyset$ is the empty relation, and $\Sigma^*:\Sigma^*$ is the universal relation. The extension operation fdext is suitably set forth as:

```
boolean fdext (Net* total, Net* current) {
    Net* featureNames = projection(current, 1) ;
    foreach feature in featureNames {
        String command = getOneString(projection(applydown(current,
        feature), 2)) ;
```

```
        Net* curValue = projection(applydown(current, feature),3) ;
        if (equals(command, "P")) {
            // Positively reset the feature value
            Net* newNet = crossProduct(feature, curValue) ;
            // just override whatever is in total
            total = uppersidePriorityUnion(newNet, total) ;
        } else if (equals(command, "U")) {
            // Unification of the new feature value
            Net* totValue = universalLanguage( ) ;
            if (contains(projection(total, 1), feature)) {
                totValue = lowerside(applydown(total, feature)) ;
            }
            Net* newValue = intersect(totValue, curValue) ;
            if (isEmpty(newValue)) {
                // unification failed, set total to empty language
                total = emptyLanguage( ) ;
                return false ;
            } else {
                Net* newNet = crossProduct(feature, newValue) ;
                total = uppersidePriorityUnion(newNet, total) ;
            }
        } else if (equals(command, "R")) {
            // Require a certain feature value
            Net* totValue = universalLanguage( ) ;
            if (contains(projection(total, 1), feature)) {
                totValue = lowerside(applydown(total, feature)) ;
            }
            if (!equivalent(totValue, curValue)) {
                total = emptyLanguage( ) ;
                return false ;
            }
        } else if (equals(command, "D")) {
            // Disallow a certain feature value
            Net* totValue = universalLanguage( ) ;
            if (contains(projection(total, 1), feature)) {
                Net* totValue = lowerside(applydown(total,
                feature)) ;
            }
            if (equivalent(totValue, curValue)) {
                total = emptyLanguage( ) ;
                return false ;
            }
        }
    }
    return true ;
}
``` and is similar to the extension operator fsunif for feature unification. The referenced projection(net, int) is suitably a function that returns one numbered tape or projection of the indicated network. The extension operation calls a number of algorithms that typically will already be available in a finite-state library.

In some weighted finite state network applications, it may be advantageous to use a tuple of semirings, rather than a single semiring, and this implies the ability to specify a matching tuple of weights on each arc, with one appropriate weight for each semiring in the tuple. Again, such tuples of weights are conveniently stored as weight-defining finite state networks. This mechanism is contemplated as providing as a very general framework for storing arbitrary weights, or arbitrary n-tuples of weights, where the weights may be numeric, strings, languages, or so forth. If the arbitrary weight, or n-tuple of weights, can be represented as some kind of string, then it can, for purposes of initial storage in the network, be considered a language of one string and encoded/stored in a finite-state network. A writer of a new semiring then can call simple functions to retrieve the string from the finite-state network and do suitable processing to parse and handle the weight or weights involved. In some such contemplated embodiments, the algorithms in the finite-state library are used to retrieve the string that represents the weight or weights. An advantage of such an approach is that it facilitates the implementation of new, non-standard semirings, using non-standard weights, without having to change the programming-interface language. In one approach, the syntax employs a string with comma-delineation or another separator delineating the elements of the tuple of weights. The string is suitably encoded as a weight-defining finite-state network object encoding a language of one string. (As an aside, it is noted that the storing of a literal string weight in a weight-defining finite-state network is a special case of storing a language weight in a weight-defining finite-state network, which was discussed previously in conjunction with the example language-union-concatenation and language-union-intersection weighting paradigms). The semiring components of the weighted finite state network library retrieve the single string from the weight-defining finite-state network, and process the string in accordance with the semiring tuple implementation (for example, parsing out the elements of the weights tuple based on the locations of the commas or other delimiters). In some contemplated embodiments, library functions of the weighted finite state network library are provided to support the retrieval of a weight-representing string by a semiring. Some suitable functions are, for example:

Bool encodesOneStringLanguage(Net*net)

where net is the pointer to the weight-defining finite-state network encoding the single-string language that represents the weight or tuple of weights. The encodesOneStringLanguage function suitably performs a semantic check to ensure that the weight-defining finite-state network encodes a single-string language. Another optional function is:

u32char*getTheOneString(Net*net)

which retrieves the single string from the weight-defining finite-state network. The semiring components of the weighted finite state network library then process the retrieved string. Instead of a comma-delineated or otherwise delineated string representation of a tuple of weights, other representations can be used.

The foregoing are illustrative examples of advantageous use of weight-defining finite state network objects to store and manipulate complex network weights. It is contemplated for the weight-defining finite state network objects to themselves be weighted finite state networks, which optionally may employ as weights another level of weight-defining finite state network objects.

In various practical applications, weights may be numbers, languages and relations, sounds, pictures, or so forth. As illustrated by the examples herein, in some such applications it is useful to define and use weighted networks wherein the weights are languages or relations; and such language/relation weights are themselves suitably stored and manipulated as finite-state networks. The use of weight-defining finite state network objects to represent weights, which are languages or relations, of a finite-state network is thus an open-ended network topology—multiple levels of weight-defining finite state network objects are contemplated. There is no inherent limit on the number of levels of weight-defining finite state network objects, although topological complexity, computational complexity and consequent computational speed reduction may impose practical limits on the number of levels of weight-defining finite state network objects that can be practically implemented in a given system.

While the use of weight-defining finite state networks is advantageous for implementing some non-numerical weights, it is also contemplated to employ weight-defining finite state networks to store complex numerical weights as strings. For example, a complex-valued weight consisting of a pair of integers might be represented as a two-level finite state network, with a string like "1" or "234" representing each integer, or a weight corresponding to coordinates in an n-dimensional space may be represented as an n-level finite state network.

The weight-defining finite state networks disclosed herein comport with semiring implementations for combining weights, which typically provides robust and reliable network operation. However, it is also contemplated to perform the methods, apparatuses, and so forth disclosed herein in conjunction with weight-defining finite state networks that are combined using operations that do not comport with a semiring implementation.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A weighted finite state network process comprising:
storing a finite state network object including one or more arcs defining one or more paths, at least one arc having an associated weight stored as a weight-defining finite state network object; and
applying the finite state network object to an input, the applying including combining weights of one or more arcs matching the input using at least one of:
  (i) a collection operation to combine weights of parallel paths, the collection operation being implemented as a finite state network-combining operation acting on weight-defining finite state network objects, and
  (ii) an extension operation to combine weights of arcs along a path, the extension operation being implemented as a finite state network-combining operation acting on weight-defining finite state network objects;
wherein the storing and the applying are performed by a processor.

2. The weighted finite state network process as set forth in claim 1, wherein each weight-defining finite state network object encodes a feature set including a plurality of feature-value pairs, and the extension operation includes a network union operation that constructs a union of input finite state network objects.

3. The weighted finite state network process as set forth in claim 1, wherein each weight-defining finite state network object encodes a string.

4. The weighted finite state network process as set forth in claim 1, wherein the finite state network object and the weight-defining finite state network objects are stored using the same network object storage format.

5. The weighted finite state network process as set forth in claim 1, wherein the storing of the finite state network object comprises:
storing pointers or handles associating weight-defining finite state network objects with arcs of the finite state network object.

6. The weighted finite state network process as set forth in claim 1, further comprising:
removing the stored finite state network object from storage, the removing including removing the stored weight-defining finite state network objects from storage.

7. The weighted finite state network process as set forth in claim 1, wherein at least one of the weight-defining finite state network objects is a weighted network including at least one weight stored as a weight-defining finite state network object.

8. The weighted finite state network process as set forth in claim 1, wherein:
the input comprises a word string; and
the applying of the finite state network object to the input word string returns possible correct spelling outputs each marked with a probability weight.

9. The weighted finite state network process as set forth in claim 8, further comprising:
presenting the possible correct spelling outputs to a human user.

10. A weighted finite state network process comprising:
storing a finite state network object including one or more arcs defining one or more paths, at least one arc having an associated weight stored as a weight-defining finite state network object, wherein each weight-defining finite state network object encodes a regular language; and
applying the finite state network object to an input, the applying including combining weights of one or more arcs matching the input using at least one of:
(i) a collection operation to combine weights of parallel paths, the collection operation being implemented as a finite state network-combining operation acting on weight-defining finite state network objects, and
(ii) an extension operation to combine weights of arcs along a path, the extension operation being implemented as a finite state network-combining operation acting on weight-defining finite state network objects;
wherein the storing and the applying are performed by a processor.

11. The weighted finite state network process as set forth in claim 10, wherein:
(i) the collection operation includes a network union operation that constructs a union of input finite state network objects, and
(ii) the extension operation includes a network concatenation operation that concatenates input finite state network objects.

12. The weighted finite state network process as set forth in claim 10, wherein:
(i) the collection operation includes a network union operation that constructs a union of input finite state network objects, and
(ii) the extension operation includes a network intersection that constructs an intersection of input finite state network objects.

13. A digital storage medium storing instructions executable to perform weighted finite state network processing including (i) storing a finite state network object including one or more arcs, at least one arc being associated with a weight stored as a weight-defining finite state network object, and (ii) applying the stored finite state network object to an input, the applying including combining weights of one or more arcs using finite state network-combining operations, wherein the storing includes storing the finite state network object and the weight-defining finite state network objects as associated but separate objects.

14. The digital storage medium as set forth in claim 13, wherein each weight-defining finite state network object encodes one of a language and a features set.

15. The digital storage medium as set forth in claim 13, wherein:
the input comprises a word string; and
the applying of the stored finite state network object to the input word string returns possible correct spelling outputs each marked with a probability weight.

16. The digital storage medium as set forth in claim 15, wherein the stored instructions are further executable to present the possible correct spelling outputs to a human user.

17. A weighted finite state network process comprising:
storing a finite state network object including one or more arcs; and
storing a weight associated with each arc of the finite state network object, each weight being stored as a weight-defining finite state network object;
wherein each weight-defining finite state network object encodes one of (i) a language and (ii) a features set; and
wherein the storing operations are performed by a processor.

18. The weighted finite state network process as set forth in claim 17, wherein each weight-defining finite state network object encodes a language.

19. The weighted finite state network process as set forth in claim 17, wherein each weight-defining finite state network object encodes a features set.

20. The weighted finite state network process as set forth in claim 17, further comprising:
storing a pointer or handle associating each weight-defining finite state network object with the corresponding arc of the finite state network object.

* * * * *